Aug. 10, 1948. D. W. MacLEOD ET AL 2,446,657
INDICATOR FOR RUBBER MIXERS OR THE LIKE
Filed Sept. 26, 1947 2 Sheets-Sheet 1
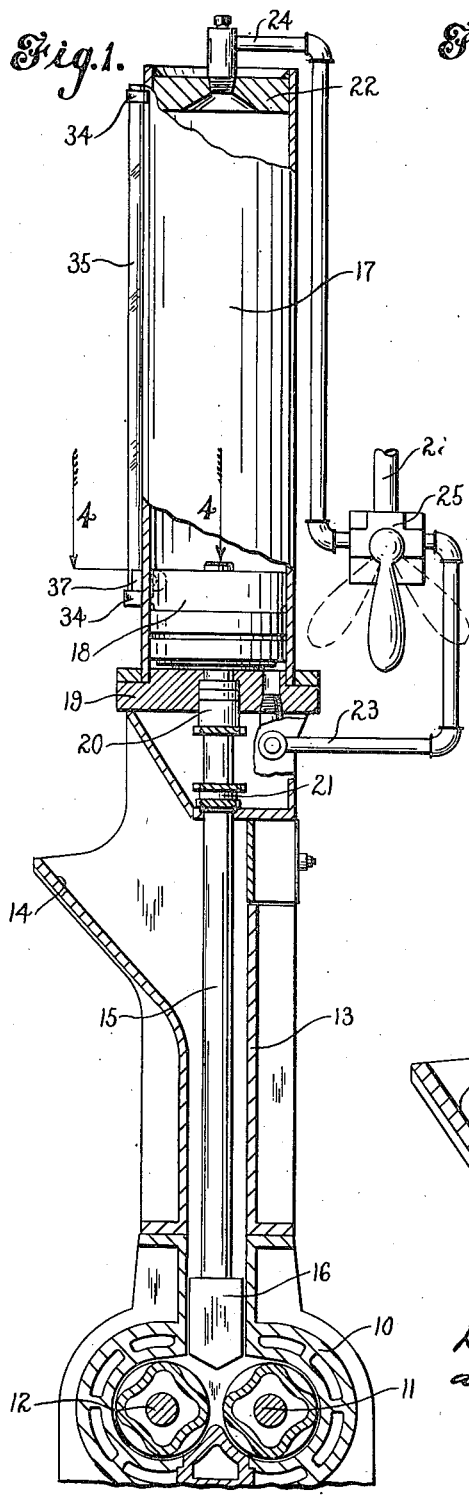
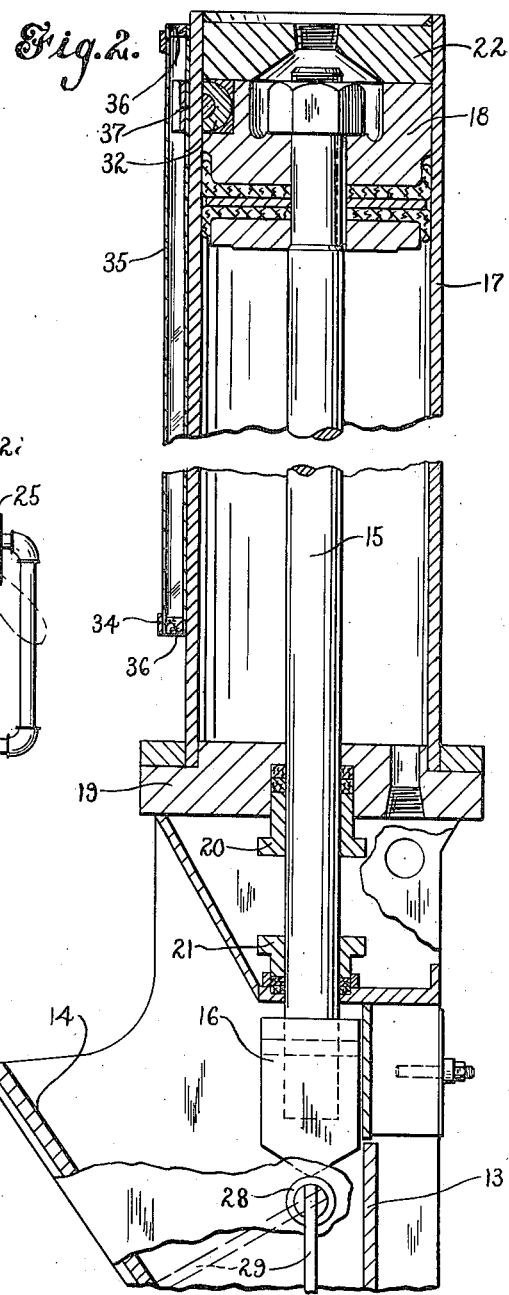
Inventor
Douglas W. MacLeod
and Raymond H. Perkins
By Rockwell & Bartholow
Attorneys Aug. 10, 1948.  D. W. MacLEOD ET AL  2,446,657
INDICATOR FOR RUBBER MIXERS OR THE LIKE
Filed Sept. 26, 1947  2 Sheets-Sheet 2

Inventor
Douglas W. MacLeod
and Raymond H. Perkins
By
Rockwell & Bartholow
Attorney Patented Aug. 10, 1948

2,446,657

UNITED STATES PATENT OFFICE 2,446,657

INDICATOR FOR RUBBER MIXERS OR THE LIKE

Douglas W. MacLeod, Ansonia, and Raymond H. Perkins, Milford, Conn., assignors to Farrel-Birmingham Company, Inc., Ansonia, Conn., a corporation of Connecticut Application September 26, 1947, Serial No. 776,182

7 Claims. (Cl. 18—2)

This invention relates to indicators for pistons or plungers, and more particularly to a device which will indicate the position of the piston or plunger of a machine, such as a rubber masticator, for example.

In machines where there is employed a piston or plunger operated by fluid pressure, it is very often desirable for the operator to know the position of the plunger at any time. As the plunger is operated by fluid pressure, the cylinder within which the piston or plunger operates must be made of material which will withstand the pressure which it is necessary to employ, and, for this reason, it is often impossible to make the cylinder of transparent material. It is, therefore, impossible for the operator to know the position of the plunger, and it is many times impracticable to arrange for a part of the plunger or an indicator on the plunger to project through the cylinder or other part of the device to give an indication of its position.

It is contemplated by the present invention to indicate the position of the piston or plunger magnetically, and to effect this result the piston is made of non-magnetic material, and a permanent magnet is attached to, or incorporated in, the piston, which magnet is of sufficient strength to act through the wall of the cylinder upon a follower or the like disposed at the outside of the cylinder.

As shown in the present application, the cylinder is also made of non-magnetic material, and upon the outer wall of this cylinder is secured a transparent tube extending longitudinally of the cylinder. Within this tube is disposed a freely slidable follower of magnetic material of light weight, so that it will be attracted by the magnet and move along the tube with the piston, thus indicating the position of the latter at all times to the operator of the machine.

Although capable of other application, the indicating device is shown in the present instance as being applied to the plunger or piston of a rubber masticator. A machine of this character is provided with a chamber within which the masticator rotors are mounted, and a charging stack is positioned above the chamber through which the material to be acted upon by the rotors is fed into the chamber. Slidably mounted in this charging stack is a weight or closure member designed to be moved upwardly to a position to permit the charging of the material into the chamber, and, after the latter has been charged, to be moved downwardly to maintain pressure upon the charge while it is being acted upon by the rotors. To this weight is secured a plunger which extends into a cylinder mounted above the charging stack and a piston is secured to the plunger within the cylinder, so that the plunger and weight may be operated by fluid pressure admitted to the cylinder in order that the weight may be held downwardly upon the charge under pressure. The indicator is mounted upon the outside of the cylinder and arranged to be moved by a magnet which is, in this instance, mounted in the piston itself.

One object of the present invention is to provide a mechanically-operated piston or plunger with an indicator which will indicate the position of the piston upon the outside of the cylinder within which the piston moves.

A still further object of the invention is to provide a machine, such as a rubber masticator, for example, with an indicator to indicate the position of the plunger or weight in the charging stack, the indicator being positioned without the cylinder within which the plunger-operating piston is mounted, and being arranged to be operated by movements of the piston.

To these and other ends the invention consists in the novel features and combinations of parts to be hereinafter described and claimed.

In the accompanying drawings:

Fig. 1 is a sectional view of a rubber masticator embodying our invention;

Fig. 2 is an enlarged sectional view of the upper portion of the charging stack and cylinder mounted thereon showing the plunger in its raised position;

Figure 3:
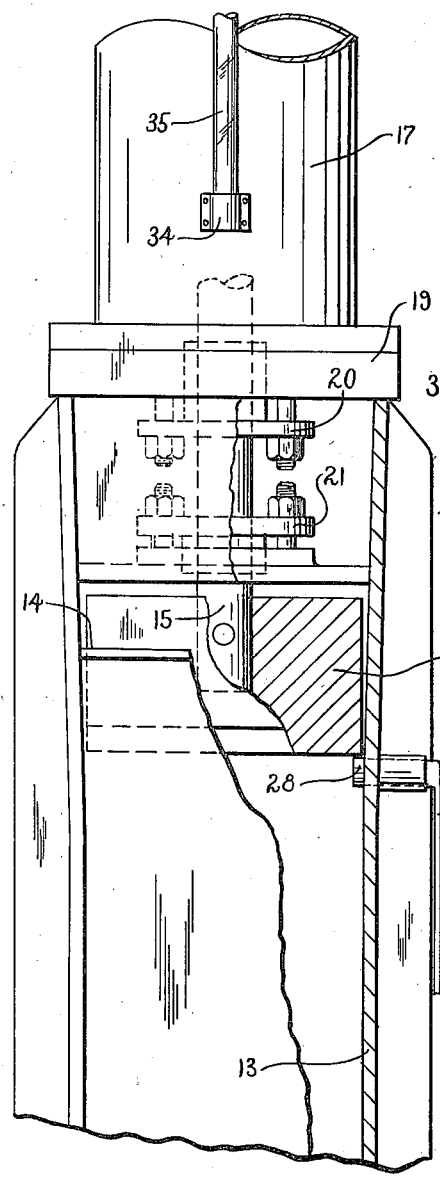
Fig. 3 is a fragmentary front elevational view of the upper portion of the charging stack, some parts being broken away for the sake of clearness.
Figure 4:
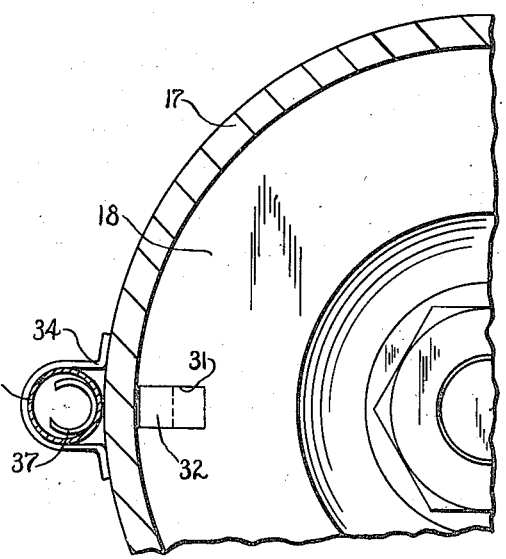
Fig. 4 is a partial sectional view on line 4—4 of Fig. 1.
Figure 5:
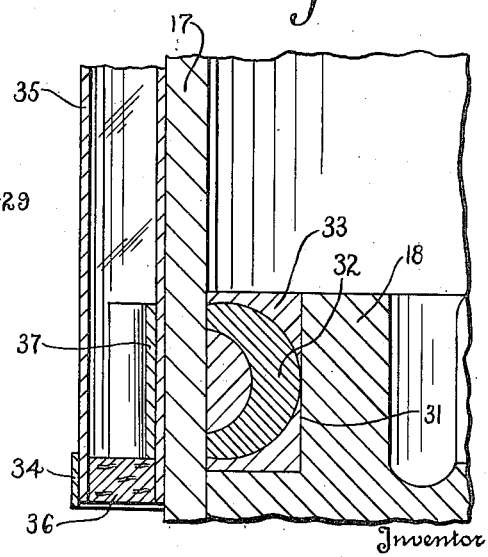
Fig. 5 is a partial vertical sectional view through the piston.

To illustrate a preferred embodiment of our invention, we have shown in Fig. 1 of the drawings a machine, such as a rubber mixer or masticator, the machine embodying a double cylindrical chamber 10 within which are mounted bladed rotors 11 and 12 which cooperate in a well-known way to mix, masticate, and reduce to plastic form, a charge of rubber or other material which may be introduced into the chamber. It will be understood that, while a double rotor machine is shown, our improvements may be employed in connection with a rubber masticator having a single rotor, and may likewise be employed with types of machines other than masticators.

Above the chamber is mounted the charging stack 13 through which the charge may be introduced into the chamber, this stack being provided with a charging opening 14. Slidably mounted in the stack is a piston rod or plunger 15 to the lower end of which is secured a weight or closure member 16, this weight being adapted, during the operation of the device, to rest upon the charge within the chamber and exert pressure thereon. It, of course, also acts to force into the chamber the material introduced into the charging stack through the opening 14.

Mounted above the charging stack is a cylinder 17, and the plunger or piston rod 15 extends into this cylinder, and secured to its upper end is the piston 18 slidably mounted within the cylinder. The lower end of the cylinder is closed by the head 19, and the piston rod passes through a packing gland 20 secured in the head 19 and also through a gland 21 secured in a portion of the upper end of the stack.

The upper end of the cylinder is closed by the head 22, and pressure fluid is introduced above and below the piston 18 through the lines 23 and 24 which lead from a suitable valve 25 controlling the introduction of fluid pressure into one or the other of the lines 23 and 24 from the line 26 leading to a source of supply. It will, of course, be obvious that, when pressure fluid is introduced to the line 23 below the piston, the weight 16 will be caused to rise, and, when fluid pressure is introduced into the cylinder through the line 24 above the piston, the weight will be caused to descend and exert pressure on the charge in the usual manner.

The upper and lower positions of the weight 16 are determined by the upper and lower heads of the cylinder, and this weight may be held in its upper position, as shown in Fig. 3, by a stop 28 mounted in the wall of the stack and manipulated to or from engagement with the weight by the handle 29.

In order to provide indicating means upon the outside of the cylinder 17, the piston 18 is composed of non-magnetic material, such as brass, for example, and in a recess 31 adjacent the periphery of the piston is mounted a permanent magnet 32 of some material which can be strongly magnetized, such, for example, as the metal "alnico." As shown, this magnet is of semi-cylindrical form, so as to present two poles at the exterior of the piston adjacent the wall of the cylinder. The magnet may be held in place by solder or the like 33.

The cylinder wall is also made of non-magnetic material, preferably some type of non-magnetic metal, as it must be sufficiently strong to withstand the high pressure of the pressure fluid used therein. Secured upon the outside of the cylinder by clips or the like 34 is a tube 35 of transparent material, such as transparent plastic, for example, the upper and lower ends of this tube being closed by plugs 36. Within this tube is mounted a follower 37 of magnetic material, this follower being, as shown, in the form of a hollow semi-cylindrical body, so that it will slide freely upwardly and downwardly in the tube 35 and, at the same time, be of relatively light weight, so that it will be attracted by the magnet 32 and be carried with the movements of the piston. It will be apparent that, as the piston moves within the cylinder 17, the indicator 37 will also move within the tube 35 and will at once indicate to the operator through the transparent tube the position of the piston and, therefore, the position of the weight 16.

In the case of some operations, such as the mastication of rubber, for example, the chamber may be charged with lumps of rubber which, when the operation is first begun, will remain in the charging stack 13. During the operation of the machine, the level of the charge will rise and fall to a considerable extent under the pressure of the rotor blades and cause the weight to reciprocate within the stack. The amount of these oscillations or reciprocations will be indicated by the follower 37. When, however, the charge is reduced to plastic form, it will be contained wholly or largely within the chamber 10, and the weight 11 will be moved to its lower position which will also be indicated by the follower. Thus the action of the follower will indicate to the operator the condition of the mass being treated within the chamber.

While we have shown and described a preferred embodiment of our invention, it will be understood that it is not to be limited to all of the details shown, but is capable of modification and variation within the spirit of the invention and within the scope of the claims.

What we claim is:

1. In a mixing or masticating machine, a chamber having an opening, a cylinder supported above the chamber, a piston in the cylinder, a weight connected to the piston and adapted to extend into said opening, a magnet carried by the piston and having pole portions substantially flush with the outer surface thereof, and a follower of magnetic material disposed at the outside of the cylinder and adapted to be moved therealong by said magnet.

2. In a device of the class described, a chamber, a cylinder, a pressure-fluid-operated piston therein, a plunger connected to the piston and extending toward the chamber, means to indicate the position of the piston in the cylinder comprising a magnet carried by the piston and having pole portions substantially flush with the outer surface thereof, a follower disposed on the outside of the cylinder wall and adapted to be moved by said magnet, and a guide tube on the cylinder within which the follower is mounted.

3. In a device of the class described, a machine having a piston-operated member and including a cylinder and a piston therein connected to said member, means to indicate the position of the piston comprising a magnet embedded in the piston and exposed at the lateral face of the piston adjacent the inner surface of the cylinder wall, a guide member on the outside of the cylinder wall and extending longitudinally thereof, and a follower freely movable in said guide member and adapted to be moved by said magnet as the piston is moved.

4. A machine for treating plastic material comprising a chamber, a piston rod extending into the chamber, an element on said rod exerting pressure on the material in the chamber, a piston connected to said rod, a cylinder within which said piston operates, means for introducing fluid pressure into the cylinder, a magnet embedded in the piston and having pole portions exposed at the lateral face of the piston, and a follower of magnetic material slidably mounted on the outside of the cylinder and adapted to be moved by the magnet.

5. A rubber masticating machine comprising a chamber, a charging stack communicating with the chamber, a weight slidably mounted in said stack, a cylinder supported upon the stack, a piston within the cylinder connected to said weight to move the same, means for introducing fluid pressure into the cylinder to move the piston, a permanent magnet embedded in the piston and having opposite pole portions exposed at the lateral face of the piston, an indicating means mounted upon the outside of the cylinder, said means comprising a follower of magnetic material adapted to be moved by said magnet, and guide means to maintain said follower against the cylinder wall.

6. A rubber masticating machine comprising a chamber, a charging stack communicating with the chamber, a weight slidably mounted in said stack, a cylinder supported upon the stack, a piston within the cylinder connected to said weight to move the same, means for introducing fluid pressure into the cylinder to move the piston, a permanent magnet embedded in the piston and exposed at the lateral surface thereof, an indicating means mounted upon the outside of the cylinder, said means comprising a follower of magnetic material adapted to be moved by said magnet, and guide means to maintain said follower against the cylinder wall, said guide means comprising a tubular member of transparent material within which the follower is mounted.

7. A rubber masticating machine comprising a chamber, a charging stack communicating with the chamber, a weight slidably mounted in said stack, a cylinder supported upon the stack, a piston within the cylinder connected to said weight to move the same, means for introducing fluid pressure into the cylinder to move the piston, a permanent magnet carried by the piston, an indicating means mounted upon the outside of the cylinder, said means comprising a follower of magnetic material adapted to be moved by said magnet, and guide means to maintain said follower against the cylinder wall, said follower comprising an element of hollow semi-cylindrical form, and said magnet being of semi-cylindrical form and presenting opposite poles substantially flush with the lateral surface of the piston.

DOUGLAS W. MacLEOD.
RAYMOND H. PERKINS.

REFERENCES CITED

The following references are of record in the file of this patent:

UNITED STATES PATENTS

| Number | Name | Date |
|---|---|---|
| 957,082 | Nash | May 3, 1910 |
| 1,216,261 | Ashley | Feb. 20, 1917 |
| 1,279,824 | Banbury | Sept. 24, 1918 |